(12) United States Patent
Ito

(10) Patent No.: US 10,637,014 B2
(45) Date of Patent: Apr. 28, 2020

(54) ENERGY STORAGE DEVICE

(71) Applicant: GS Yuasa International Ltd., Kyoto-shi (JP)

(72) Inventor: Shun Ito, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 141 days.

(21) Appl. No.: 16/066,333

(22) PCT Filed: Dec. 28, 2016

(86) PCT No.: PCT/JP2016/089145
§ 371 (c)(1),
(2) Date: Jun. 27, 2018

(87) PCT Pub. No.: WO2017/115857
PCT Pub. Date: Jul. 6, 2017

(65) Prior Publication Data
US 2019/0019999 A1    Jan. 17, 2019

(30) Foreign Application Priority Data

Dec. 28, 2015  (JP) ................................ 2015-257539

(51) Int. Cl.
*H01M 2/06* (2006.01)
*H01M 2/30* (2006.01)
(Continued)

(52) U.S. Cl.
CPC .............. *H01M 2/06* (2013.01); *H01G 11/74* (2013.01); *H01G 11/80* (2013.01); *H01G 11/82* (2013.01); *H01M 2/04* (2013.01); *H01M 2/30* (2013.01)

(58) Field of Classification Search
CPC .................................................... H01M 2/06; H01M 2/04; H01M 2/30; H01G 11/74
See application file for complete search history.

(56) References Cited

U.S. PATENT DOCUMENTS

| 2012/0070705 A1 | 3/2012 | Kim |
| 2014/0212740 A1 | 7/2014 | Munenaga et al. |
| 2015/0280275 A1 | 10/2015 | Aizawa |

FOREIGN PATENT DOCUMENTS

| JP | H 04-98268 U | 8/1992 |
| JP | 2012-064560 A | 3/2012 |

(Continued)

OTHER PUBLICATIONS

International Search Report (ISR) (PCT Form PCT/ISA/210), in PCT/JP2016/089145, dated Feb. 7, 2017.

*Primary Examiner* — Miriam Stagg
*Assistant Examiner* — Rachel L Zhang
(74) *Attorney, Agent, or Firm* — McGinn IP Law Group, PLLC.

(57) ABSTRACT

An energy storage device includes: a positive electrode terminal, a negative electrode terminal and an upper insulating member disposed between the positive electrode terminal or the negative electrode terminal and a lid body of the case. The positive electrode terminal includes, at a periphery of a first terminal body portion, a chamfered edge of which an edge is chamfered. The upper insulating member includes a peripheral wall which extends along the periphery of the first terminal body portion. The peripheral wall includes a chamfered corner of which a corner is chamfered, the chamfered corner facing the chamfered edge. A rib is formed on a chamfered inner side surface of the chamfered corner.

7 Claims, 7 Drawing Sheets

(51) Int. Cl.
*H01G 11/74* (2013.01)
*H01M 2/04* (2006.01)
*H01G 11/80* (2013.01)
*H01G 11/82* (2013.01)

(56) References Cited

FOREIGN PATENT DOCUMENTS

| | | | |
|---|---|---|---|
| JP | 2013-149435 | A | 8/2013 |
| JP | 3189700 | U | 3/2014 |
| JP | 2014-150047 | A | 8/2014 |
| JP | 2015-005479 | A | 1/2015 |
| JP | 2015-060823 | A | 3/2015 |
| JP | WO2013/031761 | A1 | 3/2015 |
| JP | 2015-191796 | A | 11/2015 |

ENERGY STORAGE DEVICE

TECHNICAL FIELD

The present invention relates to an energy storage device including an electrode terminal and an insulating member for the electrode terminal.

BACKGROUND ART

As an energy storage device such as a secondary battery, there has been known an energy storage device which includes an electrode assembly and a case housing the electrode assembly. For example, patent document 1 describes an energy storage device which includes: a can and a lid forming a case; and an external terminal mounted on the lid and functioning as an electrode terminal. In the above-mentioned energy storage device, the external terminal includes: a base portion formed of a planar portion; and a penetration portion formed on the base portion and penetrating the lid. Further, in the above-mentioned energy storage device, an external insulator functioning as an insulating member is disposed between the base portion and the lid. The external insulator has a covering wall, and the covering wall covers side surfaces of the base portion of the external terminal disposed inside the covering wall.

PRIOR ART DOCUMENTS

Patent Documents

Patent Document 1: JP-A-2014-150047

SUMMARY OF THE INVENTION

Problems to be Solved by the Invention

It is an object of the present invention to provide an energy storage device capable of suppressing the movement of an electrode terminal in an area inside an insulating member while facilitating the insertion of the electrode terminal into the area inside the insulating member.

Means for Solving the Problems

An energy storage device according to the present invention includes: a case; an electrode terminal; and an insulating member which is disposed between the electrode terminal and a wall of the case, wherein the electrode terminal includes, at a periphery thereof, a chamfered edge of which an edge is chamfered, wherein the insulating member includes a peripheral wall which extends along the periphery of the electrode terminal, wherein the peripheral wall includes a chamfered corner of which a corner is chamfered, the chamfered corner facing the chamfered edge, and wherein a protrusion is formed on a chamfered surface of the chamfered edge or a chamfered surface of the chamfered corner.

Advantages of the Invention

According to the energy storage device of the present invention, it is possible to suppress the movement of the electrode terminal in an area inside the insulating member while facilitating the insertion of the electrode terminal into the area inside the insulating member.

MODE FOR CARRYING OUT THE INVENTION

Figure 1:
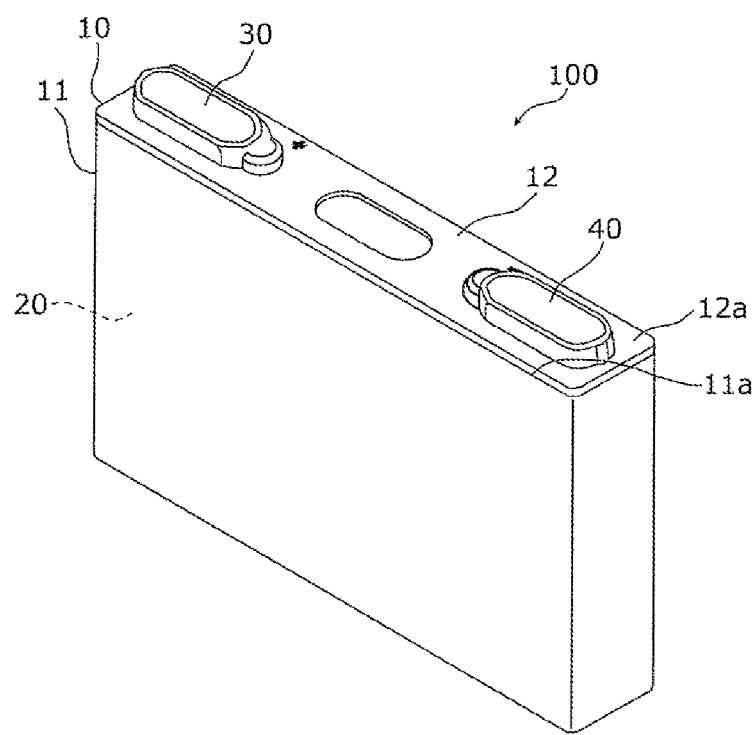
FIG. 1 is a perspective view schematically showing an external appearance of an energy storage device according to an embodiment.

Inventors of the present invention have made the following finding with respect to the technique described in the column "BACKGROUND ART". In patent document 1, the covering wall of the external insulator has a rectangular planar external shape or profile. In a case where a clearance between the covering wall of the external insulator and the base portion of the external terminal is large, there is a possibility that rattling occurs in an area inside the covering wall due to the rotational movement of the base portion. On the other hand, in a case where the clearance between the covering wall of the external insulator and the base portion of the external terminal is small, the insertion of the base portion into the area inside the covering wall becomes difficult. In view of the above, the inventors of the present invention have found the following energy storage devices in various modes for suppressing the movement of an electrode terminal in an area inside an insulating member while facilitating the insertion of the electrode terminal into the area inside the insulating member.

An energy storage device according to an aspect of the present invention includes: a case; an electrode terminal; and an insulating member which is disposed between the electrode terminal and a wall of the case, wherein the electrode terminal includes, at a periphery thereof, a chamfered edge of which an edge is chamfered, wherein the insulating member includes a peripheral wall which extends along the periphery of the electrode terminal, wherein the peripheral wall includes a chamfered corner of which a corner is chamfered, the chamfered corner facing the chamfered edge, and wherein a protrusion is formed on a chamfered surface of the chamfered edge or a chamfered surface of the chamfered corner.

In the above-mentioned configuration, the protrusion can support the electrode terminal in a direction that the protrusion faces a peripheral side surface of the electrode terminal. The insertion of the electrode terminal into an area inside the peripheral wall of the insulating member can be performed while bringing the protrusion into contact with the chamfered surface which faces the protrusion. In such an operation, such a contact using the protrusion requires a small contact area and hence, friction resistance is low. Accordingly, compared to a case where a peripheral side surface of the electrode terminal and an inner side surface of the peripheral wall are brought into direct contact with each other, a force necessary for insertion can be made small.

Accordingly, a clearance between the protrusion and the chamfered surface which faces the protrusion can be made small and hence, the movement such as rattling of the electrode terminal in the area inside the peripheral wall can be suppressed. At least at a portion of the chamfered surface, a clearance between the peripheral side surface of the electrode terminal and the inner side surface of the peripheral wall can be increased by a protruding amount of the protrusion. Accordingly, the insertion of the electrode terminal into the area inside the peripheral wall is facilitated. When the chamfered corner of the peripheral wall of the insulating member receives a force from the electrode terminal by way of the protrusion, a stress which acts on the chamfered corner is dispersed to a portion of the peripheral wall disposed adjacently to the chamfered corner. Accordingly, breaking of the peripheral wall and lowering of durability of the peripheral wall can be suppressed.

In a peripheral direction of the electrode terminal, the protrusion may be shifted from a center of the chamfered surface of the chamfered edge or a center of the chamfered surface of the chamfered corner. With such a configuration, when the rotation of the electrode terminal is generated along a peripheral direction of the electrode terminal so that the protrusion is brought into contact with the chamfered surface of the chamfered edge or the chamfered surface of the chamfered corner, the rotation is stopped. At this stage of the operation, the peripheral wall is pushed at a position shifted from the center of the chamfered surface by way of the protrusion. Accordingly, the deformation such as deflection generated at the chamfered corner of the peripheral wall including the above-mentioned chamfered surface can be suppressed at a low level. Accordingly, durability of the peripheral wall can be enhanced.

The chamfered surface of the chamfered edge may be a flat surface or a curved convex surface which extends along the periphery of the electrode terminal, and the chamfered surface of the chamfered corner may be a flat surface or a curved concave surface which faces and extends along the flat surface or curved convex surface forming the chamfered surface of the chamfered edge. In the above-mentioned configuration, by allowing the chamfered surface of the chamfered edge of the electrode terminal and the chamfered surface of the chamfered corner of the insulating member to be formed along with each other and to have substantially the same shape, it is possible to suppress the contact of the above-mentioned two chamfered surfaces at places other than the protrusion.

The electrode terminal may have a shape having a long side and a short side which intersects with the long side, the protrusion on the flat surface may be shifted outwardly in a longitudinal direction of the electrode terminal from a center of the flat surface in the peripheral direction of the electrode terminal, and the protrusion on the curved convex surface or the curved concave surface may be shifted inwardly in the longitudinal direction of the electrode terminal from a center of the curved convex surface or a center of the curved concave surface in the peripheral direction of the electrode terminal. With such a configuration, when the rotation of the electrode terminal which makes the long side of the electrode terminal directed in a direction toward the flat surface is generated, the long side of the electrode terminal is brought into contact with the protrusion on the flat surface in an initial period of rotation and hence, the rotation of the electrode terminal is stopped. On the other hand, when the rotation of the electrode terminal which makes the long side of the electrode terminal directed in a direction toward the curved convex surface or the curved concave surface is generated, the electrode terminal is brought into contact with the protrusion on the curved convex surface or the curved concave surface in an initial period of rotation and hence, the rotation of the electrode terminal is stopped. Accordingly, when the electrode terminal is rotated, it is possible to suppress the contact between the electrode terminal and the peripheral wall at places other than the protrusion.

The electrode terminal may include four chamfered edges, the peripheral wall may include four chamfered corners, a chamfered surface of at least one of the four chamfered edges may be a flat surface which extends along the periphery of the electrode terminal, a chamfered surface of at least one of the four chamfered edges may be a curved convex surface which extends along the periphery of the electrode terminal, a chamfered surface of at least one of the four chamfered corners may be a flat surface which faces and extends along the flat surface of the chamfered edge, and a chamfered surface of at least one of the four chamfered corners may be a curved concave surface which faces and extend along the curved convex surface of the chamfered edge. With such a configuration, by arranging both the combination of the flat surfaces and the combination of the curved convex surface and the curved concave surface in a mixed manner on the chamfered surfaces of the four sets of chamfered edges and four sets of chamfered corners, the positioning of a direction of the electrode terminal with respect to the peripheral wall can be performed easily.

With respect to the wall, planar shapes of an outer periphery of the electrode terminal and an inner periphery of the peripheral wall may be rectangle, two chamfered edges which include the flat surfaces may be disposed at a diagonal position, two chamfered corners which include the flat surfaces may be disposed at a diagonal position, two chamfered edges which include the curved convex surfaces may be disposed at a diagonal position, two chamfered corners which include the curved concave surfaces may be disposed at a diagonal position, in a peripheral direction of the electrode terminal, the protrusion on the flat surface may be shifted from a center of the flat surface toward a short side of the electrode terminal or a short side of the peripheral wall, in the peripheral direction of the electrode terminal, the protrusion on the curved convex surface may be shifted from a center of the curved convex surface toward a long side of the electrode terminal or a long side of the peripheral wall, and in the peripheral direction of the electrode terminal, the protrusion on the curved concave surface may be shifted from a center of the curved concave surface toward the long side of the electrode terminal or the long side of the peripheral wall.

With such a configuration, when the rotation of the electrode terminal which makes the long side of the electrode terminal directed in a direction toward the flat surface from the curved concave surface of peripheral wall is generated, the long side of the electrode terminal is brought into contact with the protrusion on the flat surface and hence, the rotation of the electrode terminal is stopped. On the other hand, when the rotation of the electrode terminal which makes the long side of the electrode terminal directed in a direction toward the curved concave surface from the flat surface of the peripheral wall is generated, the long side of the electrode terminal is brought into contact with the protrusion on the curved convex surface or the curved concave surface and hence, the rotation of the electrode terminal is stopped. Accordingly, when the electrode terminal is rotated, it is possible to suppress the contact between the electrode terminal and the peripheral wall at places other than the protrusion. As a result, the contact between the peripheral wall at the long side where a strength of the peripheral wall becomes relatively low and the electrode terminal can be suppressed and hence, durability of the peripheral wall can be enhanced.

The protrusion may be a pillar-shaped protrusion which includes a curved convex surface including a curve in a peripheral direction of the electrode terminal, and extends in a direction which intersects with the wall. With such a configuration, the protrusion is brought into contact with a linear contact portion extending along an axial direction of the pillar-shaped protrusion on the curved convex surface and hence, a contact area can be suppressed at a low level. The pillar-shaped protrusion supports the electrode terminal not only in a direction along the wall of the case but also in a direction which intersects with the wall.

Hereinafter, an energy storage device according to an embodiment of the present invention is described with reference to drawings. The embodiment described hereinafter is a comprehensive or specific example of the present invention. In the embodiment described hereinafter, numerical values, shapes, materials, constitutional elements, the arrangement positions and connection states of the constitutional elements, and the like are merely examples, and these are not intended to be used for limiting the present invention. Further, out of the constitutional elements in the embodiment described hereinafter, the constitutional elements which are not described in independent claims describing an uppermost concept are described as arbitrary constitutional elements.

Respective views in attached drawings are schematic views, in these drawings, the respective constitutional elements are not described strictly accurately. In the respective drawings, the constitutional elements identical with each other or similar to each other are given the same symbols. In the description of the embodiment made hereinafter, there may be a case where an expression added with the term "approximately" such as "approximately parallel" or "approximately orthogonal" is used. For example, "approximately parallel" means not only "completely parallel" but also "substantially parallel", that is, "approximately parallel" also includes the difference of approximately several % from "completely parallel", for example. The same goes also for other expressions with "approximately".

[Embodiment]

The configuration of the energy storage device 100 according to the embodiment is described. FIG. 1 is a perspective view schematically showing an external appearance of the energy storage device 100 according to the embodiment. As shown in FIG. 1, the energy storage device 100 has a flat rectangular parallelepiped profile. The energy storage device 100 is a secondary battery which can charge electricity and discharge electricity. For example, the energy storage device 100 is a nonaqueous electrolyte secondary battery such as a lithium ion secondary battery. However, the energy storage device 100 is not limited to a nonaqueous electrolyte secondary battery, and may be a secondary battery other than a nonaqueous electrolyte secondary battery, may be a primary battery which a user can use stored electricity without charging, or may be a capacitor.

Figure 2:
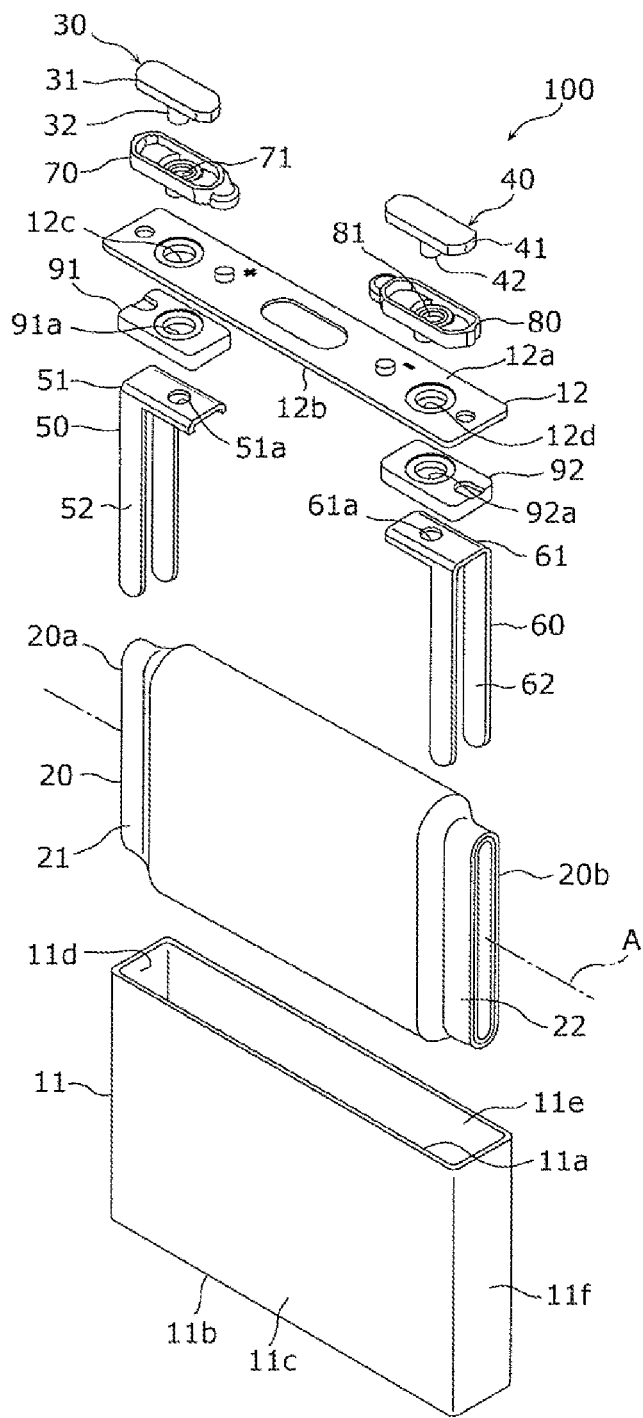
FIG. 2 is an exploded perspective view of the energy storage device shown in FIG. 1.

With reference to FIG. 1 and FIG. 2, the energy storage device 100 includes a case 10 having a flat rectangular parallelepiped shape, an electrode assembly 20 which is housed in the case 10, a positive electrode terminal 30, and a negative electrode terminal 40. FIG. 2 is an exploded perspective view of the energy storage device 100 shown in FIG. 1. Here, the positive electrode terminal 30 and the negative electrode terminal 40 are one example of an electrode terminal.

The case 10 includes a case body 11 having a bottomed rectangular cylindrical shape, and an elongated rectangular plate-like lid body 12 capable of closing an opening portion 11a of the case body 11. The case body 11 has a flat rectangular parallelepiped profile, and includes an elongated rectangular-shaped bottom wall 11b, and four rectangular-shaped side walls 11c, 11d, 11e and 11f which are raised upright from four edges of the bottom wall 11b. The side walls 11c, 11e are positioned opposite to each other, and respectively form a long side wall having a wider width in a direction along a peripheral edge of the opening portion 11a (hereinafter, the side walls 11c, 11e are also referred to as long side walls 11c, 11e). The side walls 11d, 11f are positioned opposite to each other, and respectively form a short side wall having a narrower width in a direction along the peripheral edge of the opening portion 11a (hereinafter, the side walls 11d, 11f are also referred to as short side walls 11d, 11f). The opening portion 11a has an elongated rectangular shape in the same manner as the bottom wall 11b. The positive electrode terminal 30 and the negative electrode terminal 40 are disposed on an outer surface 12a of the lid body 12. Here, the lid body 12 is one example of a wall of the case.

The case body 11 and the lid body 12 are fixed to each other such that the respective joining portions of the case body 11 and the lid body 12 are brought into an airtight state using a joining method such as welding. Although it is not limited, the case body 11 and the lid body 12 can be made of weldable metal such as stainless steel, aluminum, an aluminum alloy, for example.

Although an electrolyte such as an electrolyte solution (nonaqueous electrolyte solution in this embodiment) is sealed in the case 10, the illustration of such an electrolyte is omitted. As the electrolyte sealed in the case 10, a kind of the electrolyte is not particularly limited and any kind of electrolyte can be selected provided that performance of the energy storage device 100 is not impaired.

The positive electrode terminal 30 and the negative electrode terminal 40 are connected to a positive electrode current collector 50 and a negative electrode current collector 60 having conductivity respectively on a side opposite to the outer surface 12a of the lid body 12. The positive electrode current collector 50 and the negative electrode current collector 60 are also connected to the electrode assembly 20. Accordingly, the electrode assembly 20 is provided in a suspended manner from the lid body 12 by way of the positive electrode current collector 50 and the negative electrode current collector 60. Further, the electrode assembly 20 is housed in the case body 11 together with the positive electrode current collector 50 and the negative electrode current collector 60. There may be also a case where the electrode assembly 20 is covered by an insulating film or the like for electrically insulating the electrode assembly 20 and the case body 11 from each other. There may be also a case where a buffer member such as a spacer is disposed between the electrode assembly 20 and the case body 11.

The electrode assembly 20 is an energy storage element (also referred to as a power generating element) which can store electricity. The electrode assembly 20 includes an elongated strip-shaped sheet-like positive electrode plate, an elongated strip-shaped sheet-like negative electrode plate, and an elongated strip-shaped sheet-like separator in a state where the positive electrode plate, the negative electrode plate, and the separator are overlapped with each other in a layered manner. Further, the electrode assembly 20 is formed by winding the overlapped positive electrode plate, the negative electrode plate, and the separator together in a spiral shape multiple times about a winding axis A. The winding axis A is an imaginary axis indicated by a dotted chain line in FIG. 2, and the electrode assembly 20 has an approximately symmetrical configuration with respect to the winding axis A. In the electrode assembly 20 after winding, the positive electrode plate, the negative electrode plate and the separator are stacked in a multi-layered manner in a direction perpendicular to the winding axis A in a state where the separator is interposed between the positive electrode plate and the negative electrode plate. Although it is not limited, in this embodiment, the electrode assembly 20 has a flat profile of a flat elongated circular shape in cross section perpendicular to the winding axis A. However, the electrode assembly 20 may have a cross-sectional shape other than an elongated circular shape, and may have a circular shape, an elliptical shape, a rectangular shape, or other polygonal shape in cross section.

The positive electrode plate includes a positive electrode substrate and a positive active material layer. The positive electrode substrate is formed of an elongated strip-shaped metal foil made of metal such as aluminum, an aluminum alloy, and the positive active material layer is stacked on a surface of the positive electrode substrate using a method such as coating. The negative electrode plate includes a negative electrode substrate and a negative active material layer. The negative and positive electrode substrates are formed of an elongated strip-shaped metal foil made of metal such as copper, a copper alloy, and the negative active material layer is stacked on a surface of the negative electrode substrate using a method such as coating. The separator is a microporous sheet made of a material having an electrical insulating property such as a resin. As a positive active material used for forming the positive active material layer and a negative active material used for forming the negative active material layer, a known material can be suitably used provided that the positive active material and the negative active material are made of a material capable of occluding and discharging lithium ions.

The electrode assembly 20 has two end portions 20a, 20b disposed at positions along a winding axis A direction. On the end portion 20a, a positive active material non-forming portion 21 is formed, and on the end portion 20b, a negative active material non-forming portion 22 is formed. The positive active material non-forming portion 21 is formed in a strip shape along an edge of the positive electrode plate extending along a circumferential direction of the electrode assembly 20 which is a winding axis direction. To be more specific, the positive active material non-forming portion 21 is an edge portion of the positive electrode substrate where the positive active material layer is not formed. By multiple winding of the positive active material non-forming portion 21, the positive active material non-forming portion 21 is stacked in a multi-layered manner in a direction perpendicular to the winding axis A. Also the negative active material non-forming portion 22 is formed in a strip shape along an edge of the negative electrode plate extending along the circumferential direction of the electrode assembly 20. To be more specific, the negative active material non-forming portion 22 is an edge portion of the negative electrode substrate where the negative active material layer is not formed. By multiple winding of the negative active material non-forming portion 22, the negative active material non-forming portion 22 is stacked in a multi-layered manner in a direction perpendicular to the winding axis A.

With reference to FIG. 2, the positive electrode terminal 30, the negative electrode terminal 40, and a configuration around the positive electrode terminal 30 and the negative electrode terminal 40 are described. The positive electrode terminal 30 is an integral body formed of a rectangular plate-like first terminal body portion 31, and a circular cylindrical first shaft portion 32 which projects from a wide flat surface of the first terminal body portion 31. The negative electrode terminal 40 is an integral body formed of a rectangular plate-like second terminal body portion 41, and a circular cylindrical second shaft portion 42 which projects from a wide flat surface of the second terminal body portion 41. The first shaft portion 32 and the second shaft portion 42 respectively penetrate the lid body 12, and are connected to the positive electrode current collector 50 and the negative electrode current collector 60 respectively. On the outer surface 12a of the lid body 12, through holes 12c, 12d are formed so as to penetrate the lid body 12, and the first shaft portion 32 and the second shaft portion 42 can be made to pass through the through holes 12c, 12d respectively.

The positive electrode current collector 50 and the negative electrode current collector 60 are disposed on a side opposite to the first terminal body portion 31 and the second terminal body portion 41 with the lid body 12 sandwiched therebetween respectively. The positive electrode current collector 50 is a member having conductivity and rigidity, and is made of metal such as aluminum or an aluminum alloy in the same manner as the positive electrode substrate of the electrode assembly 20. The negative electrode current collector 60 is a member having conductivity and rigidity, and is made of metal such as copper or a copper alloy in the same manner as the negative electrode substrate of the electrode assembly 20. The positive electrode current collector 50 is an integral body formed of a plate-like fixing portion 51 which is connected to the first shaft portion 32, and two elongated plate-like projecting portions 52 which are connected to the positive active material non-forming portion 21 of the electrode assembly 20. The negative electrode current collector 60 includes a plate-like fixing portion 61 which is connected to the second shaft portion 42, and two elongated plate-like projecting portions 62 which are connected to the negative active material non-forming portion 22 of the electrode assembly 20.

On the outer surface 12a of the lid body 12, a first upper insulating member 70 is disposed between the first terminal body portion 31 of the positive electrode terminal 30 and the lid body 12. Further, a second upper insulating member 80 is disposed between the second terminal body portion 41 of the negative electrode terminal 40 and the lid body 12. On an inner surface 12b of the lid body 12 on a side opposite to the outer surface 12a, a first lower insulating member 91 is disposed between the lid body 12 and the positive electrode current collector 50. Further, a second lower insulating member 92 is disposed between the lid body 12 and the negative electrode current collector 60. The upper insulating members 70, 80 and the lower insulating members 91, 92 are respectively formed of a plate-like gasket made of a resin material having electrical insulating property, flexibility and/or elasticity. For example, as the above-mentioned resin material, polyolefin, polyphenylene sulfide (PPS), polypropylene (PP), fluororesin (PFA), phenolic resin or the like can be named. However, the above-mentioned resin material may be other resins, that is, may be a resin into which fibers such as glass fibers are mixed. Further, the upper insulating members 70, 80 and the lower insulating member 91, 92 may have a structure consisting of two or more members made of different resin materials. In this case, fluororesin (PFA) or the like may be used as a resin material for forming a portion of an insulating member for ensuring gas tightness, and an ABS, polybutylene terephthalate (PBT), polyamide (also referred to as nylon) or the like may be used as a resin material for forming a portion of the insulating member which requires a structural strength. Here, the first upper insulating member 70 and the second upper insulating member 80 are examples of the insulating member.

A through hole 71 and a through hole 91a are respectively formed in the first upper insulating member 70 and the first lower insulating member 91, and the first shaft portion 32 of the positive electrode terminal 30 can be made to pass through the through holes 71, 91a. A through hole 81 and a through hole 92a are respectively formed in the second upper insulating member 80 and the second lower insulating member 92, and the second shaft portion 42 of the negative electrode terminal 40 can be made to pass through the through holes 81, 92a.

The first shaft portion 32 of the positive electrode terminal 30 is made to penetrate the through hole 71 of the first upper insulating member 70, the through hole 12c of the lid body 12, the through hole 91a of the first lower insulating member 91, and a trough hole 51a formed in the fixing portion 51 of the positive electrode current collector 50 in this order and, thereafter, a distal end of the first shaft portion 32 is swaged. With such a configuration, the positive electrode terminal 30 and the positive electrode current collector 50 are joined to each other, and are mounted and fixed to the lid body 12 with the first upper insulating member 70 and the first lower insulating member 91 interposed therebetween. The joining by swaging is a joining using plastic deformation of the first shaft portion 32. In such a joining, since the distal end of the first shaft portion 32 receives a pressing force, the distal end of the first shaft portion 32 is plastically deformed so as to expand a diameter thereof on the fixing portion 51. With such a plastic deformation, the positive electrode terminal 30 is joined to the positive electrode current collector 50 in a state where the positive electrode terminal 30 sandwiches the fixing portion 51 and the like between the first terminal body portion 31 and the plastically deformed portion.

In the same manner, the second shaft portion 42 of the negative electrode terminal 40 is made to penetrate the through hole 81 of the second upper insulating member 80, the through hole 12d of the lid body 12, the through hole 92a of the second lower insulating member 92, and a through hole 61a formed in the fixing portion 61 of the negative electrode current collector 60 in this order and, thereafter, in the same manner as the first shaft portion 32, a distal end of the second shaft portion 42 is swaged. With such a configuration, the negative electrode terminal 40 and the negative electrode current collector 60 are joined to each other, and are mounted and fixed to the lid body 12 with the second upper insulating member 80 and the second lower insulating member 92 interposed therebetween.

The connecting structure between the positive electrode terminal 30 and the positive electrode current collector 50 and the connecting structure between the negative electrode terminal 40 and the negative electrode current collector 60 are not limited to the above-mentioned connecting structure by swaging. It is sufficient for the connecting structure to be configured such that the terminal body portion 31 or 41 and the positive electrode current collector 50 or the negative electrode current collector 60 are connected to each other in a state where the upper insulating member 70 or 80, the lid body 12, and the lower insulating member 91 or 92 are sandwiched between the terminal body portion 31 or 41 and the positive electrode current collector 50 or the negative electrode current collector 60. For example, a bolt and a nut may be used in place of the shaft portion 32 or 42, and the shaft portion 32 or 42 may be connected to the positive electrode current collector 50 or the negative electrode current collector 60 by welding.

Two projecting portions 52 of the positive electrode current collector 50 mounted on the lid body 12 are assembled to the positive active material non-forming portion 21 of the electrode assembly 20 so as to sandwich the positive active material non-forming portion 21 from both sides of the positive active material non-forming portion 21 thus being joined to the positive active material non-forming portion 21. In the same manner, two projecting portions 62 of the negative electrode current collector 60 mounted on the lid body 12 are assembled to the negative active material non-forming portion 22 of the electrode assembly 20 so as to sandwich the negative active material non-forming portion 22 from both sides of the negative active material non-forming portion 22 thus being joined to the negative active material non-forming portion 22. In the above-mentioned joining, welding such as ultrasonic welding or resistance welding can be used. With such a joining, the electrode assembly 20 is fixed to the lid body 12 in a state where the winding axis A is directed along the lid body 12. That is, the electrode assembly 20 constitutes a vertically winding-type electrode assembly. The positive electrode terminal 30 is physically and electrically connected to the positive electrode plate of the electrode assembly 20 by way of the positive electrode current collector 50. The negative electrode terminal 40 is physically and electrically connected to the negative electrode plate of the electrode assembly 20 by way of the negative electrode current collector 60.

Figure 3:
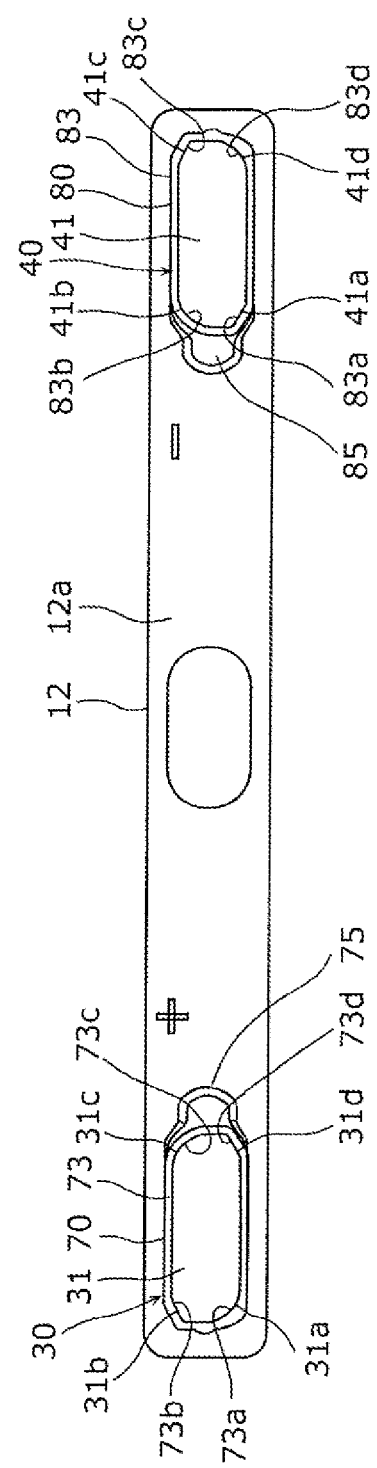
FIG. 3 is a plan view of a lid body of the energy storage device shown in FIG. 2.
Figure 4:
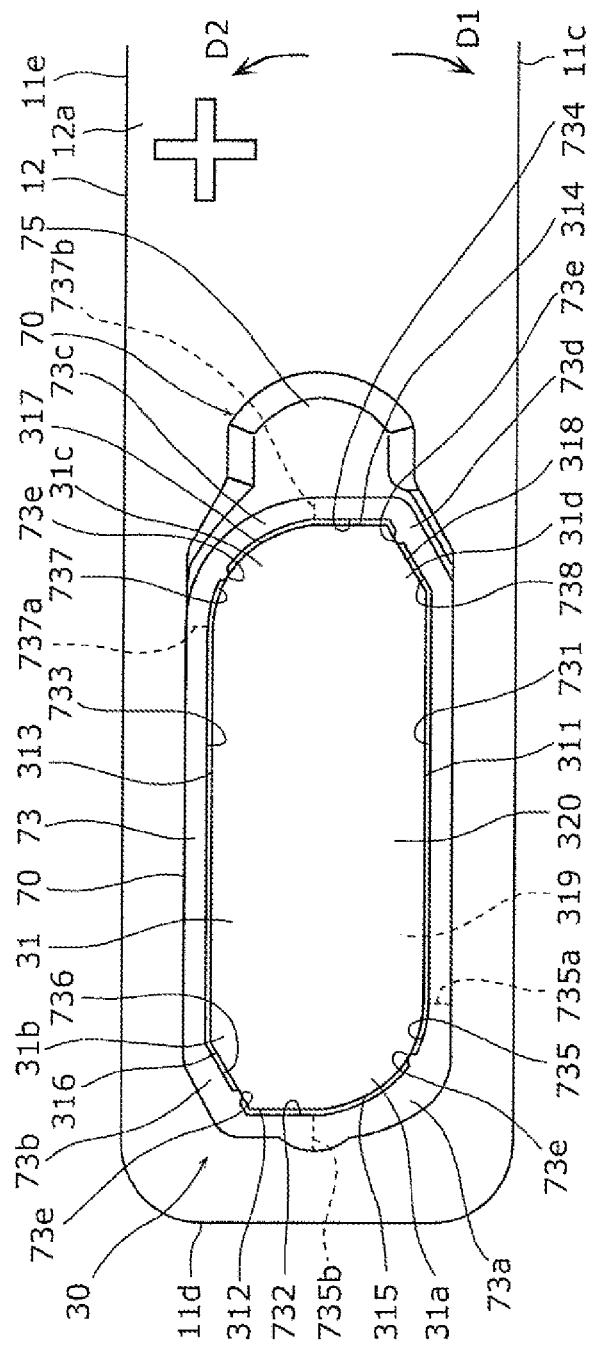
FIG. 4 is an enlarged plan view of a positive electrode terminal and a first upper insulating member disposed on the lid body shown in FIG. 3.
Figure 5:
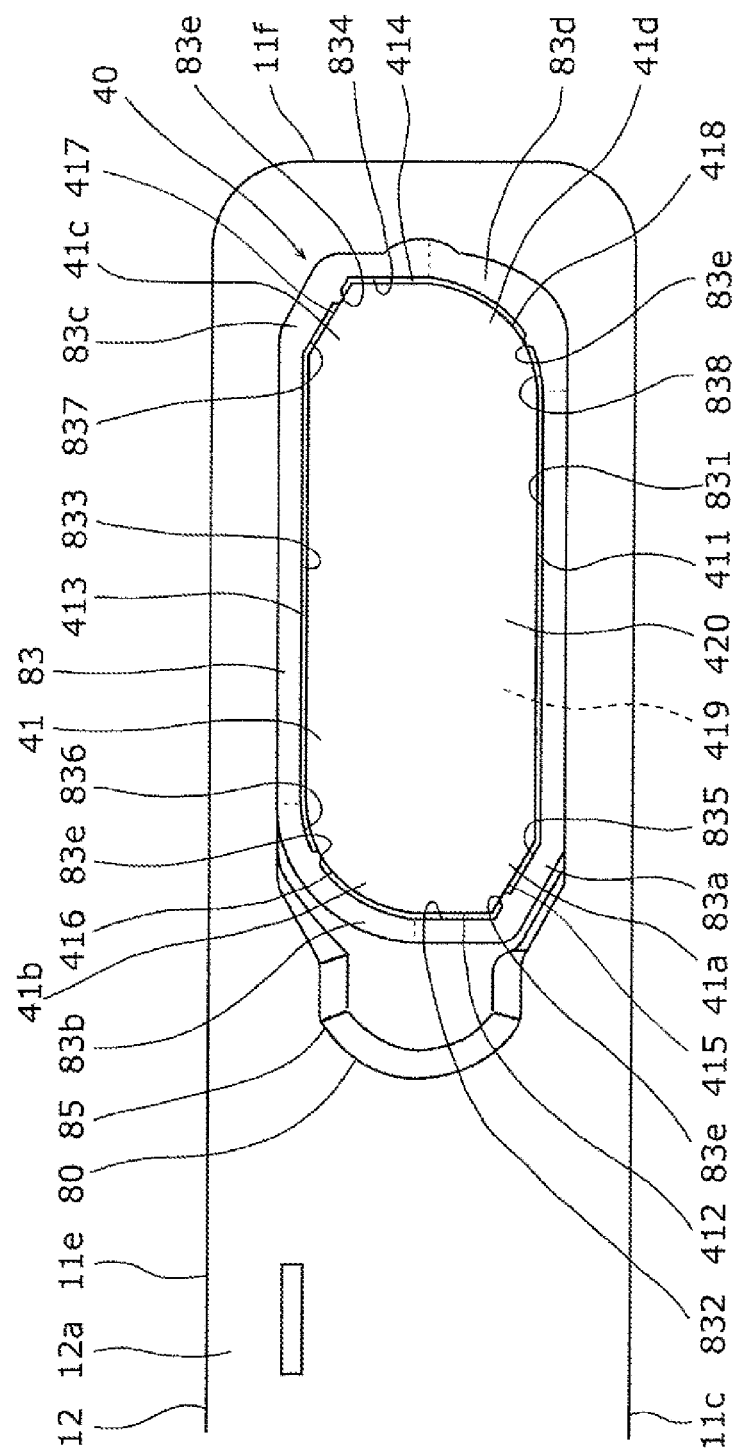
FIG. 5 is an enlarged plan view of a negative electrode terminal and a second upper insulating member disposed on the lid body shown in FIG. 3.
Figure 6:
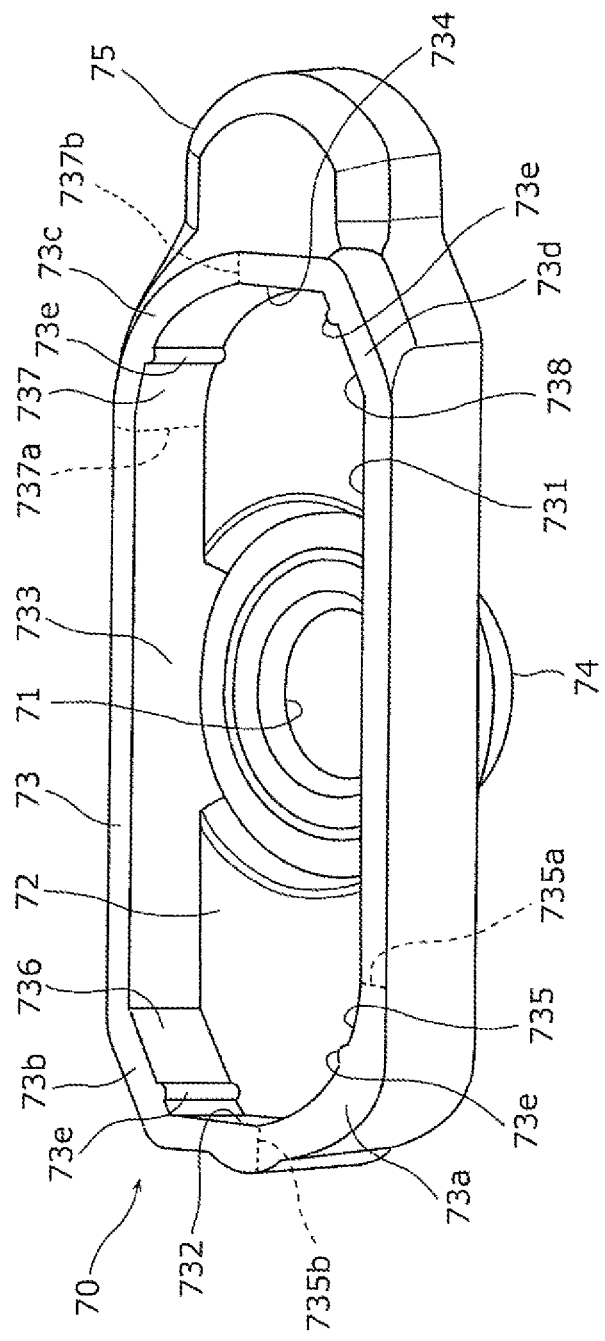
FIG. 6 is a perspective view of the first upper insulating member shown in FIG. 4.
Figure 7:
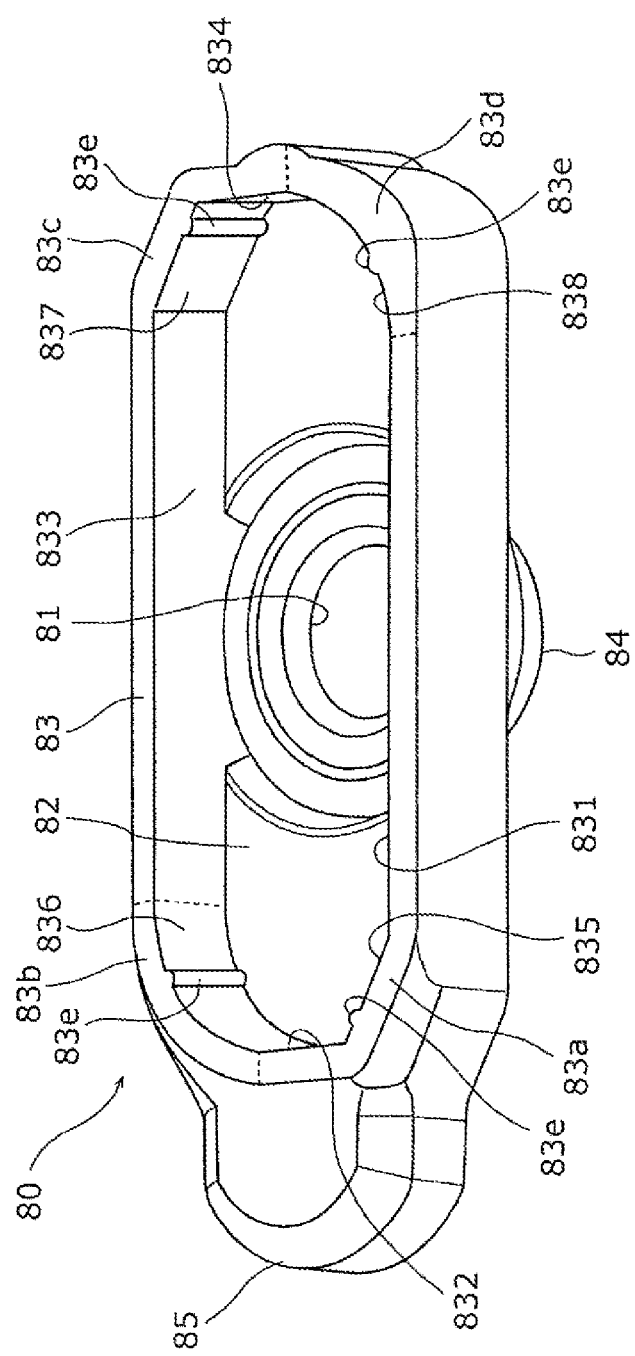
FIG. 7 is a perspective view of the second upper insulating member shown in FIG. 5.

Further, the detailed configurations of the positive electrode terminal 30, the negative electrode terminal 40, the first upper insulating member 70, and the second upper insulating member 80 are described with reference to FIG. 3 to FIG. 7. FIG. 3 is a plan view of the lid body 12 of the energy storage device 100 shown in FIG. 2. FIG. 4 is an enlarged plan view of the positive electrode terminal 30 and the first upper insulating member 70 on the lid body 12 shown in FIG. 3. FIG. 5 is an enlarged plan view of the negative electrode terminal 40 and the second upper insulating member 80 on the lid body 12 shown in FIG. 3. FIG. 6 is a perspective view of the first upper insulating member 70 shown in FIG. 4. FIG. 7 is a perspective view of the second upper insulating member 80 shown in FIG. 5.

With reference to FIG. 3, FIG. 4 and FIG. 5, both the first terminal body portion 31 of the positive electrode terminal 30 and the second terminal body portion 41 of the negative electrode terminal 40 have a rectangular planar shape. The planar shape means the shapes of the first terminal body portion 31 and the second terminal body portion 41 when the lid body 12 is viewed from the outside of the case 10 in a direction perpendicular to the outer surface 12a of the lid body 12, that is, the shapes of the first terminal body portion 31 and the second terminal body portion 41 as viewed in a plan view of the lid body 12.

As shown in FIG. 3 and FIG. 4, as viewed in a plan view of the lid body 12, all four edges of the first terminal body portion 31 are chamfered. At two chamfered edges 31a, 31c which are disposed on the first terminal body portion 31 in a diagonal positional relationship, chamfering is performed such that the chamfered edges 31a, 31c have an arc shape. To be more specific, the chamfered edges 31a, 31c are chamfered in a curved shape formed of a plurality of continuous arcs having different radii. At other two chamfered edges 31b, 31d which are disposed on the first terminal body portion 31 in a diagonal positional relationship, chamfering is performed such that the chamfered edges 31b, 31d have a straight line shape. With such a configuration, a peripheral side surface of the first terminal body portion 31 which is raised upright with respect to the outer surface 12a is formed of curved chamfered side surfaces 315, 317 respectively positioned at the chamfered edges 31a, 31c, flat chamfered side surfaces 316, 318 respectively positioned at the chamfered edges 31b, 31d, flat long side surfaces 311, 313 positioned opposite to each other, and flat short side surfaces 312, 314 positioned opposite to each other. When the positive electrode terminal 30 is mounted on the lid body 12, the short side surface 312 of the first terminal body portion 31 is positioned so as to face the short side wall 11d of the case body 11, the long side surface 311 is positioned so as to face the long side wall 11c, and the long side surface 313 is positioned so as to face the long side wall 11e.

The curved chamfered side surfaces 315, 317 respectively form an arc convex surface which projects outward along the outer surface 12a, that is, a curved convex surface. The curved chamfered side surface 315 forms a chamfered surface of an edge formed by the long side surface 311 and the short side surface 312, and extends along a tangent direction of the long side surface 311 and a tangent direction of the short side surface 312. The curved chamfered side surface 317 forms a chamfered surface of an edge formed by the long side surface 313 and the short side surface 314, and extends along a tangent direction of the long side surface 313 and a tangent direction of the short side surface 314. The flat chamfered side surface 316 forms a flat chamfered surface of an edge formed by the short side surface 312 and the long side surface 313, and extends in directions which intersect with the short side surface 312 and the long side surface 313. The flat chamfered side surface 318 forms a flat chamfered surface of an edge formed by the short side surface 314 and the long side surface 311, and extends in directions which intersect with the short side surface 314 and the long side surface 311.

The first terminal body portion 31 has wide flat surfaces 319, 320. The flat surface 319 faces the outer surface 12a of the lid body 12 when the positive electrode terminal 30 is mounted on the lid body 12, and the flat surface 320 is positioned on a side opposite to the flat surface 319. The first shaft portion 32 is disposed on the flat surface 319.

As shown in FIG. 3 and FIG. 5, as viewed in a plan view of the lid body 12, all four edges of the second terminal body portion 41 of the negative electrode terminal 40 are chamfered. The second terminal body portion 41 has, in the same manner as the first terminal body portion 31, two chamfered edges 41a, 41c which are disposed in a diagonal positional relationship and are chamfered in a straight line shape, and two chamfered edges 41b, 41d which are disposed in a diagonal positional relationship and are chamfered in an arc shape. With such a configuration, a peripheral side surface of the second terminal body portion 41 which is raised upright with respect to the outer surface 12a is formed of flat chamfered side surfaces 415, 417 which are positioned at the chamfered edges 41a, 41c respectively, curved chamfered side surfaces 416, 418 which are positioned at the chamfered edges 41b, 41d respectively, flat long side surfaces 411, 413, and flat short side surfaces 412, 414. When the negative electrode terminal 40 is mounted on the lid body 12, the short side surface 414 of the second terminal body portion 41 is positioned so as to face the short side wall 11f of the case body 11, the long side surface 411 is positioned so as to face the long side wall 11c, and the long side surface 413 is positioned so as to face the long side wall 11e.

The flat chamfered side surface 415 forms a flat chamfered surface of an edge formed by the long side surface 411 and the short side surface 412, and extends in directions which intersect with these two side surfaces. The flat chamfered side surface 417 forms a flat chamfered surface of an edge formed by the long side surface 413 and the short side surface 414, and extends in a direction which intersects with these two side surfaces. The curved chamfered side surface 416 forms an arc convex surface shaped chamfered surface of an edge formed by the short side surface 412 and the long side surface 413, and extends along tangent directions of these two side surfaces. The curved chamfered side surface 418 forms an arc convex surface shaped chamfered surface of an edge formed by the short side surface 414 and the long side surface 411, and extends along tangent directions of these two side surfaces.

The second terminal body portion 41 has wide flat surfaces 419, 420. The flat surface 419 faces the outer surface 12a of the lid body 12 when the negative electrode terminal 40 is mounted on the lid body 12, and the flat surface 420 is positioned on a side opposite to the flat surface 419. The second shaft portion 42 is disposed on the flat surface 419.

Next, the configurations of the first upper insulating member 70 and the second upper insulating member 80 are described. The first upper insulating member 70 and the second upper insulating member 80 have substantially the same configuration except for a point that a profile of the first terminal body portion 31 housed in the first upper insulating member 70 and a profile of the second terminal body portion 41 housed in the second upper insulating member 80 are different from each other. Accordingly, in the description made hereinafter, the description is made mainly with respect to the configuration of the first upper insulating member 70.

With reference to FIG. 2 and FIG. 6, the first upper insulating member 70 is an integral body formed of a rectangular plate-like body portion 72, a peripheral wall 73 which is raised upright from a peripheral edge of the body portion 72, a circular-cylindrical cylindrical portion 74 which projects from the body portion 72 toward a side opposite to the peripheral wall 73, and a fixing portion 75 which projects from the peripheral wall 73. The body portion 72, the peripheral wall 73, the cylindrical portion 74, and the fixing portion 75 are integrally formed with each other, and are made of a continuous resin material. The first upper insulating member 70 is configured such that the first terminal body portion 31 is disposed in the inside of the peripheral wall 73 on the body portion 72. The peripheral wall 73 extends along a peripheral side surface shape of the first terminal body portion 31, and surrounds the peripheral side surface of the first terminal body portion 31. The peripheral wall 73 has a shape of a strip-like protrusion forming a continuous ring. A through hole 71 is formed in the body portion 72, and the through hole 71 is positioned at an approximately center of the body portion 72. The through hole 71 penetrates the cylindrical portion 74 in an axial direction, and functions also as a through hole of the cylindrical portion 74. On a surface of the body portion 72 on a cylindrical portion 74 side, a protrusion not shown in the drawing is formed. The protrusion is formed such that the protrusion is fitted in a recessed portion formed on the outer surface 12a of the lid body 12. A fitting hole not shown in the drawing is formed in the fixing portion 75, and the fitting hole is formed such that the protrusion protruding from the lid body 12 is fitted in the fitting hole. The position of the through hole 71 and the cylindrical portion 74 is not limited to the approximately center of the body portion 72, and the through hole 71 and the cylindrical portion 74 may be disposed at any position of the body portion 72.

Accordingly, when the positive electrode terminal 30 and the first upper insulating member 70 are mounted on the lid body 12, the body portion 72 of the first upper insulating member 70 is interposed between the first terminal body portion 31 of the positive electrode terminal 30 and the lid body 12 thus electrically insulating the positive electrode terminal 30 and the lid body 12 from each other. Further, the cylindrical portion 74 of the first upper insulating member 70 passes through the through hole 12c of the lid body 12 in an extending manner, and is interposed between the first shaft portion 32 of the positive electrode terminal 30 and the lid body 12 thus electrically insulating the first shaft portion 32 of the positive electrode terminal 30 and the lid body 12 from each other. Still further, the protrusion of the lid body 12 is fitted in the fitting hole of the fixing portion 75, and the protrusion of the body portion 72 is fitted in the recessed portion of the lid body 12. Due to such two fittings, the first upper insulating member 70 is fixed such that neither the translational movement nor the rotational movement of the first upper insulating member 70 on the outer surface 12a of the lid body 12 occur.

With reference to FIG. 3, FIG. 4 and FIG. 6, as viewed in a plan view of the lid body 12, all four corners of the peripheral wall 73 having a rectangular planar shaped profile are chamfered. The peripheral wall 73 has curved chamfered corners 73a, 73c which are disposed adjacently to the chamfered edges 31a, 31c of the first terminal body portion 31 respectively, and straight-line-shaped chamfered corners 73b, 73d which are disposed adjacently to the chamfered edges 31b, 31d of the first terminal body portion 31 respectively. The chamfered corners 73a, 73b, 73c, and 73d are chamfered along the chamfered shapes of the chamfered edges 31a, 31b, 31c, and 31d.

The peripheral wall 73 has curved chamfered inner side surfaces 735, 737 which are disposed adjacently to the curved chamfered side surfaces 315, 317 of the first terminal body portion 31 respectively, and flat chamfered inner side surfaces 736, 738 which are disposed adjacently to the flat chamfered side surfaces 316, 318 of the first terminal body portion 31 respectively. Further, the peripheral wall 73 has long inner side surfaces 731, 733 which are disposed adjacently to the long side surfaces 311, 313 of the first terminal body portion 31, and short inner side surfaces 732, 734 which are disposed adjacently to the short side surfaces 312, 314 of the first terminal body portion 31 respectively.

The long inner side surfaces 731, 733 are respectively flat inner side surfaces which face long side surfaces 311, 313 of the first terminal body portion 31 respectively and extend substantially parallel to the long side surfaces 311, 313 respectively. The short inner side surfaces 732, 734 are respectively flat inner side surfaces which face the short side surfaces 312, 314 of the first terminal body portion 31 respectively and extend substantially parallel to the short side surfaces 312, 314 respectively. The curved chamfered inner side surfaces 735, 737 are respectively chamfered surfaces having an arc concave surface shape, that is, a curved concave surface shape which face the curved chamfered side surfaces 315, 317 of the first terminal body portion 31 respectively, and extend substantially parallel to the curved chamfered side surfaces 315, 317 respectively. The curved chamfered inner side surface 735 extends along a tangent direction of the long inner side surface 731 and a tangent direction of the short inner side surface 732. The curved chamfered inner side surface 737 extends along a tangent direction of the long inner side surface 733 and a tangent direction of the short inner side surface 734. The flat chamfered inner side surfaces 736, 738 are respectively flat chamfered surfaces which face the flat chamfered side surfaces 316, 318 of the first terminal body portion 31 respectively, and extend substantially parallel to the flat chamfered side surfaces 316, 318 respectively. The fixing portion 75 of the first upper insulating member 70 is disposed adjacently to a portion of the short inner side surface 734 of the peripheral wall 73.

In FIG. 4 and FIG. 6, the chamfered corner 73a and the curved chamfered inner side surface 735 are a portion of the peripheral wall 73 in a region between two boundaries 735a, 735b indicated by a broken line and an inner side surface of the portion respectively. In FIG. 4 and FIG. 6, the chamfered corner 73c and the curved chamfered inner side surface 737 are a portion of the peripheral wall 73 in a region between two boundaries 737a, 737b indicated by a broken line and an inner side surface of the portion respectively.

One semicircular pillar-shaped rib 73e is formed on the curved chamfered inner side surfaces 735, 737 respectively. One semicircular pillar-shaped rib 73e is formed on the flat chamfered inner side surfaces 736, 738 respectively. With respect to the respective ribs 73e, circular pillar surfaces of the ribs 73e are made to project from the inner side surfaces 735, 737 toward the inside of the peripheral wall 73, and a longitudinal direction of the rib 73e, that is, an axial direction of a circular pillar axis is made to extend along a direction raised upright from the body portion 72, that is, in an upright direction of the peripheral wall 73. In this embodiment, the rib 73e is one example of the protrusion.

The rib 73e on the curved chamfered inner side surface 735 is shifted toward the long inner side surface 731 and away from the short inner side surface 732, that is, shifted toward the long side of the peripheral wall 73 and away from the short side of the peripheral wall 73. The rib 73e on the curved chamfered inner side surface 737 is shifted toward the long inner side surface 733 and away from the short inner side surface 734, that is, shifted toward the long side of the peripheral wall 73 and away from the short side of the peripheral wall 73. The rib 73e on the flat chamfered inner side surface 736 is shifted toward the short inner side surface 732 and away from the long inner side surface 733, that is, shifted toward the short side of the peripheral wall 73 and away from the long side of the peripheral wall 73. The rib 73e on the flat chamfered inner side surface 738 is shifted toward the short inner side surface 734 and away from the long inner side surface 731, that is, shifted toward the short side of the peripheral wall 73 and away from the long side of the peripheral wall 73.

In a state where the first terminal body portion 31 is disposed inside the peripheral wall 73, a slight clearance, that is, a gap is formed between four ribs 73e and the chamfered side surfaces 315, 316, 317 and 318 of the first terminal body portion 31 respectively, or at least one of four ribs 73e is brought into contact with at least one of the chamfered side surfaces 315, 316, 317 and 318. Further, a gap is formed between the inner side surfaces 731 to 738 of the peripheral wall 73 and the side surfaces 311 to 318 of the first terminal body portion 31 respectively. When the rib 73e is brought into contact with the chamfered side surface 315, 316, 317 or 318, the circular pillar surface of the rib 73e can be brought into contact with the chamfered side surface 315, 316, 317 or 318 over the whole length of the rib 73e in a circular pillar axial direction.

Accordingly, in a case where a rotational force about the first shaft portion 32 acts on the first terminal body portion 31 disposed in the inside of the peripheral wall 73, for example, when a direction of the rotational force is directed in a direction D1 which is a clockwise direction on FIG. 4, the first terminal body portion 31 presses the ribs 73e on the flat chamfered inner side surfaces 736, 738 of the peripheral wall 73. Then, the first terminal body portion 31 is not brought into contact with other portions of the peripheral wall 73 or is brought into contact with other portions of the peripheral wall 73 at a pressing force significantly smaller than a pressing force on the ribs 73e on the flat chamfered inner side surfaces 736, 738, and does not press the ribs 73e on the curved chamfered inner side surfaces 735, 737 or presses the ribs 73e on the curved chamfered inner side surfaces 735, 737 at a pressing force significantly smaller than the pressing force on the ribs 73e on the flat chamfered inner side surfaces 736, 738. When a direction of the rotational force is directed in a direction D2 which is a counterclockwise direction on the drawing, the first terminal body portion 31 presses the ribs 73e on the curved chamfered inner side surfaces 735, 737. Then, the first terminal body portion 31 is not brought into contact with other portions of the peripheral wall 73 or is brought into contact with other portions of the peripheral wall 73 at a pressing force significantly smaller than a pressing force on the ribs 73e on the curved chamfered inner side surfaces 735, 737, and does not press the ribs 73e on the flat chamfered inner side surfaces 736, 738 or presses the ribs 73e on the flat chamfered inner side surfaces 736, 738 at a pressing force significantly smaller than the pressing force on the ribs 73e on the curved chamfered inner side surfaces 735, 737. A protrusion amount of the rib 73e from the inner side surface of the peripheral wall 73 and a gap between the inner side surface of the peripheral wall 73 and a peripheral side surface of the first terminal body portion 31 can be set to satisfy the above-mentioned configuration.

In this embodiment, the rib 73e on the curved chamfered inner side surface 735 is shifted toward the long inner side surface 731 and away from the short inner side surface 732. That is, the rib 73e on the curved chamfered inner side surface 735 is shifted toward the long inner side surface 731 from a center of the curved chamfered inner side surface 735 along an inner peripheral direction of the peripheral wall 73. Further, the rib 73e on the curved chamfered inner side surface 737 is shifted toward the long inner side surface 733 and away from the short inner side surface 734. That is, the rib 73e on the curved chamfered inner side surface 737 is shifted toward the long inner side surface 733 from a center of the curved chamfered inner side surface 737 along the inner peripheral direction of the peripheral wall 73. These ribs 73e are disposed at portions where, when the first terminal body portion 31 is rotated in the direction D2, the curved chamfered side surfaces 315, 317 of the first terminal body portion 31 approach the curved chamfered inner side surfaces 735, 737 respectively in an initial period of rotation.

The rib 73e on the flat chamfered inner side surface 736 is shifted toward the short inner side surface 732 and away from the long inner side surface 733. That is, the rib 73e on the flat chamfered inner side surface 736 is shifted toward a short inner side surface 732 side from a center of the flat chamfered inner side surface 736 along the inner peripheral direction of the peripheral wall 73. Further, the rib 73e on the flat chamfered inner side surface 738 is shifted toward the short inner side surface 734 and away from the long inner side surface 731. That is, the rib 73e on the flat chamfered inner side surface 738 is shifted toward a short inner side surface 734 side from a center of the flat chamfered inner side surface 738 along the inner peripheral direction of the peripheral wall 73. Accordingly, the above-mentioned ribs 73e disposed at portions where, when the first terminal body portion 31 is rotated in the direction D1, the flat chamfered side surfaces 316, 318 of the first terminal body portion 31 approach the flat chamfered inner side surfaces 736, 738 respectively in an initial period of rotation.

Accordingly, it is possible to suppress the occurrence of a phenomenon that the first terminal body portion 31 is brought into contact with portions of the chamfered inner side surfaces 735 to 738 of the peripheral wall other than the ribs 73e at the time of rotation of the first terminal body portion 31.

In both the case where a direction of the rotational force is the direction D1 and the case where a direction of the rotational force is the direction D2, the chamfered corners 73a to 73d of the peripheral wall 73 receive a rotational force of the first terminal body portion 31 by way of the ribs 73e. However, the extension lengths of the chamfered corners 73a to 73d in an inner peripheral direction of the peripheral wall 73 are small so that the chamfered corners 73a to 73d have high rigidity whereby the chamfered corners 73a to 73d are minimally deformed. Accordingly, the deformation of the peripheral wall 73 can be suppressed and, particularly, the deformation of the long inner side surfaces 731, 733 where an extension length is maximum so that rigidity becomes relatively lowest compared to other portions can be suppressed.

Further, when a direction of a rotational force is the direction D1, with respect to pressing forces acting on the chamfered corners 73b, 73d by way of the ribs 73e respectively, a second component in a deflection direction of the chamfered corner 73b, 73d is significantly smaller than a first component in an axial direction of the chamfered corner 73b, 73d. The axial directions of the chamfered corners 73b, 73d are also directions along the flat chamfered inner side surfaces 736, 738 respectively, and deflection directions of the chamfered corners 73b, 73d are also directions perpendicular to the flat chamfered inner side surfaces 736, 738 respectively. A first component of a pressing force acts on the chamfered corner 73b in a direction toward the long inner side surface 733, and acts on the chamfered corner 73d in a direction toward the long inner side surface 731. Accordingly, the deformation by deflection of the chamfered corners 73b, 73d can be suppressed.

When a direction of a rotational force is the direction D2, with respect to pressing forces acting on the chamfered corners 73a and 73c by way of the ribs 73e respectively, a second component in a deflection direction of the chamfered corner 73a, 73c is significantly smaller than a first component in an axial direction of the chamfered corner 73a, 73c. The axial directions of the chamfered corners 73a, 73c are also directions along the curved chamfered inner side surfaces 735, 737 respectively, and deflection directions of the chamfered corners 73a, 73c are directions perpendicular to the curved chamfered inner side surfaces 735, 737 respectively. A first component of a pressing force acts on the chamfered corner 73a in a direction toward the long inner side surface 731, and acts on the chamfered corner 73c in a direction toward the long inner side surface 733. Accordingly, the deformation by deflection of the chamfered corners 73a, 73c can be suppressed.

In accommodating the first terminal body portion 31 in the inside of the peripheral wall 73 of the first upper insulating member 70, the first terminal body portion 31 can be inserted into the inside of the peripheral wall 73 in a state where the first terminal body portion 31 is brought into contact with only the ribs 73e. Accordingly, a sliding area between the first terminal body portion 31 and the first upper insulating member 70 can be made small and hence, the insertion of the first terminal body portion 31 can be facilitated. Further, the rib 73e having a small cross-sectional area in a direction perpendicular to the circular pillar axial direction possesses flexibility and/or elasticity and hence, also in a case where it is necessary to insert the first terminal body portion 31 into the inside of the peripheral wall 73 in a state where a clearance between each rib 73e and the first terminal body portion 31 is minimum, the first terminal body portion 31 can be inserted into the inside of the peripheral wall 73 by easily deforming the ribs 73e.

The second upper insulating member 80 has substantially the same configuration as the first upper insulating member 70 except that arrangement of straight-line-shaped chamfered edges 41a, 41c and curved chamfered edges 41b, 41d of the second terminal body portion 41 of the negative electrode terminal 40 to be housed in the second upper insulating member 80 differs from the corresponding arrangement of the first terminal body portion 31 of the positive electrode terminal 30. With reference to FIG. 5 and FIG. 7, the second upper insulating member 80 includes a body portion 82, a peripheral wall 83, a cylindrical portion 84, and a fixing portion 85 which are integrally formed with each other. The peripheral wall 83 has an inner side surface which extends along a peripheral side surface shape of the second terminal body portion 41. When the negative electrode terminal 40 and the second upper insulating member 80 are mounted on the lid body 12, the body portion 82 of the second upper insulating member 80 is interposed between the second terminal body portion 41 of the negative electrode terminal 40 and the lid body 12 so that the negative electrode terminal 40 and the lid body 12 are electrically insulated from each other. Further, the cylindrical portion 84 of the second upper insulating member 80 is interposed between the second shaft portion 42 of the negative electrode terminal 40 and the lid body 12 so that the negative electrode terminal 40 and the lid body 12 are electrically insulated from each other. In this embodiment, although the cylindrical portion 84 and the through hole 81 are disposed at a center of the body portion 82, the cylindrical portion 84 and the through hole 81 may be disposed at any position of the body portion 82.

The peripheral wall 83 of the second upper insulating member 80 includes long inner side surfaces 831, 833, short inner side surfaces 832, 834, flat chamfered inner side surfaces 835, 837, and arc concave surface shaped, that is, curved concave surface shaped curved chamfered inner side surfaces 836, 838. The flat chamfered inner side surfaces 835, 837 are positioned at the chamfered corners 83a, 83c of the peripheral wall 83 respectively, and the curved chamfered inner side surfaces 836, 838 are positioned at the chamfered corners 83b, 83d of the peripheral wall 83 respectively. The long inner side surfaces 831, 833, the short inner side surfaces 832, 834, the flat chamfered inner side surfaces 835, 837, and the curved chamfered inner side surfaces 836, 838 of the peripheral wall 83 are positioned respectively adjacently to the long side surfaces 411, 413, the short side surfaces 412, 414, the flat chamfered side surfaces 415, 417, and the curved chamfered side surfaces 416, 418 of the second terminal body portion 41 and extend along these side surfaces respectively. The fixing portion 85 is disposed adjacently to the portion of the short inner side surface 832 of the peripheral wall 83.

One rib 83e is formed on the flat chamfered inner side surfaces 835, 837 and the curved chamfered inner side surfaces 836, 838 respectively. The rib 83e formed on the flat chamfered inner side surface 835 is shifted toward the short inner side surface 832 and away from the long inner side surface 831. The rib 83e on the flat chamfered inner side surface 837 is shifted toward the short inner side surface 834 and away from the long inner side surface 833. The rib 83e on the curved chamfered inner side surface 836 is shifted toward the long inner side surface 833 and away from the short inner side surface 832. The rib 83e on the curved chamfered inner side surface 838 is shifted toward the long inner side surface 831 and away from the short inner side surface 834. The other configurations and the manner of the operation of the second upper insulating member 80 are substantially equal to those of the first upper insulating member 70 and hence, their description is omitted.

As described above, the energy storage device 100 according to this embodiment includes the case 10, the positive electrode terminal 30 and the negative electrode terminal 40, and the upper insulating members 70, 80 which are disposed between the positive electrode terminal 30 and the lid body 12 of the case 10 and between the negative electrode terminal 40 and the lid body 12 of the case 10 respectively. The positive electrode terminal 30 has the chamfered edges 31a to 31d which are chamfered edges formed on the periphery of the first terminal body portion 31 of the positive electrode terminal 30. The first upper insulating member 70 has the peripheral wall 73 which extends along the periphery of the first terminal body portion 31. The peripheral wall 73 has the chamfered corners 73a to 73d which are chamfered corners facing the chamfered edges 31a to 31d respectively. The rib 73e which is the protrusion is formed on the chamfered inner side surfaces 735 to 738 of the chamfered corners 73a to 73d respectively.

In the above-mentioned configuration, the ribs 73e can support the positive electrode terminal 30 in directions that the ribs 73e face the peripheral side surfaces 311 to 318 of the first terminal body portion 31 of the positive electrode terminal 30 respectively. The insertion of the first terminal body portion 31 into the inside of the peripheral wall 73 of the first upper insulating member 70 can be performed while allowing the ribs 73e to be brought into contact with the chamfered side surfaces 315 to 318 of the chamfered edges 31a to 31d which face the ribs 73e respectively. In such an operation, contacting of the chamfered side surfaces 315 to 318 at the ribs 73e can make a contact area small so that a friction resistance becomes small. Accordingly, compared to a case where the peripheral side surfaces 311 to 318 of the first terminal body portion 31 and the inner side surfaces 731 to 738 of the peripheral wall 73 are directly brought into contact with each other, a force necessary for such an insertion can be made small. Accordingly, the clearance between the chamfered side surfaces 315 to 318 and the ribs 73e can be made small, and the movement such as rattling of the first terminal body portion 31 in the inside of the peripheral wall 73 can be suppressed. Further, at the chamfered side surfaces 315 to 318, the clearance between the peripheral side surfaces of the first terminal body portion 31 and the inner side surfaces of the peripheral wall 73 can be increased at least by an amount of protrusion of the ribs 73e. Accordingly, the insertion of the first terminal body portion 31 into the inside of the peripheral wall 73 can be facilitated. Further, when the chamfered corners 73a to 73d of the peripheral wall 73 receive a force from the first terminal body portion 31 by way of the ribs 73e, a stress acting on the chamfered corners 73a to 73d is dispersed to portions of the peripheral wall 73 disposed adjacently to the chamfered corners 73a to 73d respectively. Accordingly, a damage and lowering of durability of the peripheral wall 73 can be suppressed. In the same manner as the positive electrode terminal 30 and the first upper insulating member 70, the negative electrode terminal 40 and the second upper insulating member 80 also have the above-mentioned configuration, and can acquire the above-mentioned manner of operation and advantageous effects.

In the energy storage device 100 according to the embodiment, the ribs 73e are shifted from the centers of the chamfered inner side surfaces 735 to 738 of the chamfered corners 73a to 73d in the peripheral direction of the first terminal body portion 31 of the positive electrode terminal 30. In the above-mentioned configuration, when the first terminal body portion 31 is rotated along the peripheral direction of the first terminal body portion 31 and the ribs 73e are brought into contact with the chamfered inner side surfaces 735 to 738 of the chamfered corners 73a to 73d, the rotation is stopped. In this case, the chamfered corners 73a to 73d are pressed by way of the ribs 73e at positions shifted from the centers of the chamfered inner side surfaces 735 to 738. With such a configuration, deformation such as deflection generated at the chamfered corners 73a to 73d can be suppressed at a low level. Accordingly, durability of the peripheral wall 73 is enhanced. In the same manner as the positive electrode terminal 30 and the first upper insulating member 70, the negative electrode terminal 40 and the second upper insulating member 80 also have the above-mentioned configurations, and can acquire the above-mentioned manner of operation and advantageous effects.

In the energy storage device 100 according to the embodiment, the chamfered side surfaces 315 to 318 of the chamfered edges 31a to 31d of the first terminal body portion 31 of the positive electrode terminal 30 are flat surfaces or curved convex surfaces extending along the periphery of the first terminal body portion 31, and the chamfered inner side surfaces 735 to 738 of the chamfered corners 73a to 73d of the first upper insulating member 70 are flat surfaces or curved concave surfaces extending along the above-mentioned flat surfaces or the above-mentioned curved convex surfaces in a facing manner. In the above-mentioned configuration, by forming the chamfered side surfaces 315 to 318 of the first terminal body portion 31 and the chamfered inner side surfaces 735 to 738 of the first upper insulating member 70 into substantially the same shape so as to extend along with each other, it is possible to suppress the occurrence of a phenomenon that two side surfaces formed of the chamfered side surface and the chamfered inner side surface which face each other are brought into contact with each other at places other than the ribs 73e. In the same manner as the positive electrode terminal 30 and the first upper insulating member 70, the negative electrode terminal 40 and the second upper insulating member 80 also have the above-mentioned configurations and can acquire the above-mentioned manner of operation and advantageous effects.

In the energy storage device 100 according to the embodiment, the first terminal body portion 31 of the positive electrode terminal 30 has a shape including long sides and short sides which intersect with the long sides respectively. The ribs 73e formed on the flat chamfered inner side surfaces 736, 738 which are flat surfaces of the peripheral wall 73 are shifted outward in the longitudinal direction of the first terminal body portion 31 from the centers of the flat chamfered inner side surfaces 736, 738 in the peripheral direction of the first terminal body portion 31. Further, the ribs 73e formed on the curved chamfered inner side surfaces 735, 737 which are curved concave surfaces of the peripheral wall 73 are shifted inward in the longitudinal direction from the centers of the curved chamfered inner side surfaces 735, 737 in the peripheral direction.

In the above-mentioned configuration, in the first terminal body portion 31 of the positive electrode terminal 30, when the first terminal body portion 31 is rotated such that the long sides of the first terminal body portion 31 are directed in a direction toward the flat chamfered inner side surface 736 or 738, the first terminal body portion 31 is brought into contact with the rib 73e on at least one of the flat chamfered inner side surfaces 736, 738 in an initial period of rotation so that the rotation of the first terminal body portion 31 is stopped. Further, in the first terminal body portion 31, when the first terminal body portion 31 is rotated such that the long sides of the first terminal body portion 31 are directed in a direction toward the curved chamfered inner side surface 735 or 737, the first terminal body portion 31 is brought into contact with the rib 73e on at least one of the curved chamfered inner side surfaces 735, 737 in an initial period of rotation so that the rotation of the first terminal body portion 31 is stopped. Accordingly, it is possible to suppress the occurrence of a phenomenon that, at the time of rotation of the first terminal body portion 31, the first terminal body portion 31 and the peripheral wall 73 are brought into contact with each other at places other than the ribs 73e. In the same manner as the positive electrode terminal 30 and the first upper insulating member 70, the negative electrode terminal 40 and the second upper insulating member 80 also have the above-mentioned configurations and can acquire the above-mentioned manner of operation and advantageous effects.

In the energy storage device 100 according to the embodiment, the chamfered side surface 316, 318 of at least one chamfered edge out of the chamfered edges 31a to 31d of the first terminal body portion 31 of the positive electrode terminal 30 is a flat surface extending along the periphery of the first terminal body portion 31, and the chamfered side surface 315, 317 of at least one chamfered edge is a curved convex surface extending along the periphery of the first terminal body portion 31. Further, the chamfered inner side surface 736, 738 of at least one chamfered corner out of the chamfered corners 73a to 73d of the peripheral wall 73 of the first upper insulating member 70 is a flat surface facing and extending along the flat chamfered side surface 316, 318, and the chamfered inner side surface 735, 737 of at least one chamfered corner is a curved concave surface facing and extending along the chamfered side surface 315, 317 which is a curved convex surface. In the above-mentioned configuration, by arranging the combination of the flat surfaces and the combination of the curved convex surface and the curved concave surface in a mixed manner on the chamfered surfaces of the four sets each of which is formed of the chamfered edge and the chamfered corner (chamfered edges 31a to 31d and chamfered corners 73a to 73d), the direction of the first terminal body portion 31 with respect to the peripheral wall 73 can be easily positioned. In the same manner as the positive electrode terminal 30 and the first upper insulating member 70, the negative electrode terminal 40 and the second upper insulating member 80 also have the above-mentioned configurations and can acquire the above-mentioned manner of operation and advantageous effects.

In the energy storage device 100 according to the embodiment, planar shapes of an outer periphery of the first terminal body portion 31 of the positive electrode terminal 30 and an inner periphery of the peripheral wall 73 are rectangle to the lid body 12 of the case 10. Two chamfered edges 31b, 31d which include the flat surfaces and two chamfered corners 73b, 73d which include the flat surfaces are respectively disposed at a diagonal position. Two chamfered edges 31a, 31c which include the curved convex surfaces and two chamfered corners 73a, 73d which include the curved concave surfaces are respectively disposed at a diagonal position. The ribs 73e on the flat chamfered inner side surfaces 736, 738 which are flat surfaces are shifted from the centers of the flat chamfered inner side surfaces 736, 738 in the peripheral direction of the first terminal body portion 31 toward the short sides of the peripheral wall 73. The ribs 73e on the curved chamfered inner side surfaces 735, 737 which are curved concave surfaces are shifted from the centers of the curved chamfered inner side surfaces 735, 737 in the peripheral direction of the first terminal body portion 31 toward the long sides of the peripheral wall 73.

In the above-mentioned configuration, in the first terminal body portion 31 of the positive electrode terminal 30, when the first terminal body portion 31 of the positive electrode terminal 30 is rotated such that the long side of the first terminal body portion 31 is directed in a direction from the curved chamfered inner side surface 735 or 737 of the peripheral wall 73 toward the flat chamfered inner side surface 736 or 738 of the peripheral wall 73, the first terminal body portion 31 is brought into contact with the ribs 73e on the flat chamfered inner side surfaces 736, 738 so that the rotation of the first terminal body portion 31 is stopped. On the other hand, in the first terminal body portion 31, when the first terminal body portion 31 is rotated in a direction that the long side of the first terminal body portion 31 is directed from the flat chamfered inner side surface 736 or 738 of the peripheral wall 73 toward the curved chamfered inner side surface 735 or 737 of the peripheral wall 73, the first terminal body portion 31 is brought into contact with the ribs 73e on the curved chamfered inner side surfaces 735, 737 so that the rotation of the first terminal body portion 31 is stopped. Accordingly, it is possible to suppress the occurrence of a phenomenon that, at the time of rotation of the first terminal body portion 31, the first terminal body portion 31 and the peripheral wall 73 are brought into contact with each other at places other than the ribs 73e. With such a configuration, contacting of the first terminal body portion 31 with the long side of the peripheral wall 73 where a strength of the peripheral wall 73 becomes relatively low can be suppressed and hence, durability of the peripheral wall 73 can be enhanced. In the same manner as the positive electrode terminal 30 and the first upper insulating member 70, the negative electrode terminal 40 and the second upper insulating member 80 also have the above-mentioned configurations, and can acquire the above-mentioned manner of operation and advantageous effects.

In the energy storage device 100 according to the embodiment, the rib 73e is a pillar-shaped protrusion having a curved convex surface including a curve in the peripheral direction of the first terminal body portion 31 of the positive electrode terminal 30 and extending in a direction which is perpendicular to the lid body 12 of the case 10. In the above-mentioned configuration, the rib 73e is brought into contact with the first terminal body portion 31 at a linear contact portion along the axial direction of the pillar-shaped protrusion on the curved convex surface and hence, a contact area can be suppressed at a low level. The rib 73e supports the first terminal body portion 31 not only in a direction along the lid body 12 but also in a direction which is perpendicular to the lid body 12. In the same manner as the positive electrode terminal 30 and the first upper insulating member 70, the negative electrode terminal 40 and the second upper insulating member 80 also have the above-mentioned configurations, and can acquire the above-mentioned manner of operation and advantageous effects.

[Other Modifications]

Although the energy storage device according to the embodiment of the present invention has been described heretofore, the present invention is not limited to the above-mentioned embodiment. That is, it should be construed that the embodiment disclosed in this specification is only for an exemplifying purpose in all aspects and is not limited. The scope of the present invention is not designated by the above-mentioned description but is designated by Claims, and it is intended that all modifications which fall within the meaning and the scope equivalent to Claims are also included in the scope of the present invention.

In the energy storage device 100 according to the embodiment, although the stacked electrode assembly 20 is a winding-type electrode assembly formed by winding the positive electrode plate, the negative electrode plate, and the separator which are stacked to each other, the electrode assembly 20 is not limited to the winding-type electrode assembly. The stacked electrode assembly may be a stacking-type electrode assembly which is formed by stacking a large number of positive electrode plates, a large number of negative electrode plates, and a large number of separators, and may be a Z-type electrode assembly which is formed by folding one set or two or more sets of a positive electrode plate, a negative electrode plate and a separator which are stacked to each other in plural times.

In the energy storage device 100 according to the embodiment, the first terminal body portion 31 of the positive electrode terminal 30 and the second terminal body portion 41 of the negative electrode terminal 40 respectively have two straight-line-shaped chamfered edges which are disposed at a diagonal position, and two curved chamfered edges which are disposed at a diagonal position. The peripheral wall 73 of the first upper insulating member 70 and the peripheral wall 83 of the second upper insulating member 80 respectively have two straight-line-shaped chamfered corners disposed at a diagonal position, and two curved chamfered corners disposed at a diagonal position. The combination of the straight-line-shaped chamfered edge and the curved chamfered edge, the number of straight-line-shaped chamfered edge, and the number of curved chamfered edge are not limited to the above-mentioned configuration. All four edges may be formed of a straight-line-shaped chamfered edge or a curved chamfered edge. The configuration may be adopted where one of four edges is a straight-line-shaped chamfered edge or a curved chamfered edge, and other three of four edges are curved chamfered edges or straight-line-shaped chamfered edges. Straight-line-shaped chamfered edges may be formed as edges disposed adjacently to each other, or curved chamfered edges may be formed as edges disposed adjacently to each other. In the same manner, the combination of the straight-line-shaped chamfered corner and the curved chamfered corner, the number of straight-line-shaped chamfered corners, and the number of curved chamfered corners are also not limited to the above-mentioned configuration.

In the energy storage device 100 according to the embodiment, all curved chamfered edges of the first terminal body portion 31 and the second terminal body portion 41, and all curved chamfered corners of the peripheral wall 73 of the first upper insulating member 70 and the peripheral wall 83 of the second upper insulating member 80 have an arc shaped curved surface. However, the present invention is not limited to such a configuration. The curved chamfered edges and the curved chamfered corners may have any curved surface. For example, the curved chamfered edges of the first terminal body portion 31 and the second terminal body portion 41 may have a curved concave surface, and the curved chamfered corners of the peripheral walls 73, 83 may have a curved convex surface.

In the energy storage device 100 according to the embodiment, the first terminal body portion 31 of the positive electrode terminal 30 and the second terminal body portion 41 of the negative electrode terminal 40 respectively have a rectangular planar shape. However, the present invention is not limited to such a configuration, and the first terminal body portion 31 of the positive electrode terminal 30 and the second terminal body portion 41 of the negative electrode terminal 40 may have a circular planar shape, an elliptical planar shape, or other polygonal planar shapes. For example, when the first terminal body portion has a circular planar shape, a chamfered edge having a chamfered surface along a chord of the circle can be formed on the first terminal body portion.

In the energy storage device 100 according to the embodiment, on the peripheral wall 73 of the first upper insulating member 70 and on the peripheral wall 83 of the second upper insulating member 80, one rib 73e or 83e is formed on one chamfered corner. However, two or more ribs may be formed on one chamfered corner. For example, it may be configured such that one of two ribs formed on one chamfered corner receives a pressing force of the first terminal body portion 31 or the second terminal body portion 41 of the negative electrode terminal 40 which rotates in the direction D1, and the other of two ribs receives a pressing force of the first terminal body portion 31 or the second terminal body portion 41 of the negative electrode terminal 40 which rotates in the direction D2. In this case, the ribs may not be formed on all four chamfered corners, and the ribs may be formed on two chamfered corners disposed at a diagonal position. Also with such a configuration, the contact between the first terminal body portion 31 or the second terminal body portion 41 of the negative electrode terminal 40 and the peripheral wall 73 or 83 can be suppressed.

In the energy storage device 100 according to the embodiment, on the peripheral wall 73 of the first upper insulating member 70 and on the peripheral wall 83 of the second upper insulating member 80, the rib on the flat chamfered inner side surface of the chamfered corner is shifted toward the short inner side surface and away from the long inner side surface, and the rib on the arc concave surface shaped chamfered inner side surface of the chamfered corner is shifted toward the long inner side surface and away from the short inner side surface. However, the present invention is not limited to such a configuration. The rib may be disposed at the center of the chamfered inner side surface, and may be disposed at any position on the chamfered inner side surface. The position of the rib on the chamfered inner side surface can be set corresponding to the shapes and sizes of the first terminal body portion 31 and the second terminal body portion 41, a shape of the rib, a protrusion amount of the rib and the like.

In the energy storage device 100 according to the embodiment, the ribs 73e of the peripheral wall 73 of the first upper insulating member 70 and the ribs 83e of the peripheral wall 83 of the second upper insulating member 80 have a semi-circular pillar shape extending along the chamfered inner side surface of the chamfered corner of the peripheral wall. However, the present invention is not limited to such a configuration. The rib may have any shape provided that the rib has a shape protruding from the chamfered inner side surface. For example, the pillar-shaped rib may have a shape extending not along an upright direction of the peripheral wall 73, 83, but along a longitudinal direction of the peripheral wall 73, 83 perpendicular to the above-mentioned upright direction, that is, an extending direction of the peripheral wall 73, 83. Further, the rib may not have a pillar shape, and the rib may be formed of a simple protrusion. For example, a protrusion may have a step-wised stepped shape having one or more steps as viewed in a plan view of the lid body 12. In this case, the step-wised step may be formed on a boundary portion between a chamfered inner side surface of the peripheral wall and the long inner side surface or the short inner side surface of the peripheral wall, and may be formed on the chamfered inner side surface. The step-wised step may extend over the whole length of the peripheral wall in an upright direction of the peripheral wall, and may extend on a portion of the peripheral wall. Further, as described later, when a protrusion is formed on the chamfered side surface of the first terminal body portion 31 of the positive electrode terminal 30 and the chamfered side surface of the second terminal body portion 41 of the negative electrode terminal 40, a step-wised step may be formed on a boundary portion between the long side surface or the short side surface and the chamfered side surface of the first terminal body portion 31 and the second terminal body portion 41, or may be formed on the chamfered side surface. The step-wised step may extend over the whole length of the side surface of the first terminal body portion 31 and the side surface of the second terminal body portion 41 in the upright direction of the side surface of the first terminal body portion 31 and the side surface of the second terminal body portion 41, and may extend on a portion of the side surface of the first terminal body portion 31 and a portion of the side surface of the second terminal body portion 41.

In the energy storage device 100 according to the embodiment, the ribs 73e are formed on the peripheral wall 73 of the first upper insulating member 70 and the ribs 83e are formed on the peripheral wall 83 of the second upper insulating member 80. However, the present invention is not limited to such a configuration. Ribs may be formed on the flat chamfered side surfaces and the curved chamfered side surfaces of the first terminal body portion 31 of the positive electrode terminal 30 and the second terminal body portion 41 of the negative electrode terminal 40 respectively. Alternatively, ribs may be formed on either one of the peripheral wall 73 or the first terminal body portion 31 or may be formed on both the peripheral wall 73 and the first terminal body portion 31 in a mixed manner, and ribs may be formed on either one of the peripheral wall 83 or the second terminal body portion 41 or may be formed on both the peripheral wall 83 and the second terminal body portion 41 in a mixed manner.

The energy storage device 100 according to the embodiment has one electrode assembly. However, an energy storage device may have two or more electrode assemblies.

In the energy storage device 100 according to the embodiment, the electrode assembly 20 is configured such that the positive electrode current collector 50 and the negative electrode current collector 60 are connected to the electrode assembly 20 via the positive active material non-forming portion 21 and the negative active material non-forming portion 22 respectively. However, the present invention is not limited to such a configuration. An electrode assembly may have a group of positive electrode current collecting tabs formed of positive electrode current collecting tabs projecting from a positive electrode substrate, and a group of negative electrode current collecting tabs formed of negative electrode current collecting tabs projecting from the negative electrode substrate on two end portions of the electrode assembly respectively. The group of positive electrode current collecting tabs and the group of the negative electrode current collecting tabs may be disposed on one end portion of the electrode assembly. In the above-mentioned configuration, the group of positive electrode current collecting tabs and the group of negative electrode current collecting tabs are connected to the positive electrode current collector and the negative electrode current collector respectively.

The energy storage device 100 according to the embodiment includes the vertically winding-type electrode assembly 20. However, the energy storage device 100 may be configured to include a transversely winding-type electrode assembly where the electrode assembly 20 is disposed in a direction that an end portion of the electrode assembly 20 in the winding axis A direction faces the lid body 12 of the case 10.

The description of the energy storage device 100 according to the embodiment has been made by taking the non-aqueous electrolyte secondary battery such as a lithium ion secondary battery as an example. However, as the energy storage device 100, an energy storage device having any configuration may be used provided that the energy storage device includes an electrode terminal, and an insulating member for the electrode terminal.

Further, the configurations which are made by arbitrarily combining the configurations of the above-mentioned embodiment and the configurations of the modifications are also included in the scope of the present invention. The present invention can be realized not only in the form of the above-mentioned energy storage device but also in the form of an energy storage apparatus including one or more energy storage devices. For example, an energy storage apparatus can be configured to include a plurality of energy storage units disposed in a row, and each energy storage unit can be configured to include the plurality of energy storage devices 100 disposed in a row. Due to the above-mentioned configuration, it is possible to realize a high-output energy storage apparatus. Further, the plurality of energy storage devices 100 are used as one unit, and the number of energy storage units and the arrangement of the energy storage units can be selected corresponding to an electric capacity necessary for an energy storage apparatus, and a shape, a size and the like of the energy storage apparatus.

INDUSTRIAL APPLICABILITY

The present invention is applicable to an energy storage device such as a lithium ion secondary battery and the like.

DESCRIPTION OF REFERENCE SIGNS

10: case
12: lid body (wall)
30: positive electrode terminal (electrode terminal)
31: first terminal body portion
31a, 31b, 31c, 31d: chamfered edge
40: negative electrode terminal (electrode terminal)
41: second terminal body portion
41a, 41b, 41c, 41d: chamfered edge
70: first upper insulating member (insulating member)
73, 83: peripheral wall
73a, 73b, 73c, 73d: chamfered corner
73e, 83e: rib (protrusion)
80: second upper insulating member (insulating member)
83a, 83b, 83c, 83d: chamfered corner
100: energy storage device
315, 316, 317, 318: chamfered side surface (chamfered surface)
415, 416, 417, 418: chamfered side surface (chamfered surface)
735, 736, 737, 738: chamfered inner side surface (chamfered surface)
835, 836, 837, 838: chamfered inner side surface (chamfered surface)

The invention claimed is:

1. An energy storage device comprising:
a case;
an electrode terminal; and
an insulating member which is disposed between the electrode terminal and a wall of the case,
wherein the electrode terminal includes, at a periphery thereof, a chamfered edge of which an edge is chamfered,
wherein the insulating member includes a peripheral wall which extends along the periphery of the electrode terminal,
wherein the peripheral wall includes a chamfered corner of which a corner is chamfered, the chamfered corner facing the chamfered edge, and
wherein a protrusion is formed on a chamfered surface of the chamfered edge or a chamfered surface of the chamfered corner.

2. The energy storage device according to claim 1, wherein, in a peripheral direction of the electrode terminal, the protrusion is shifted from a center of the chamfered surface of the chamfered edge or a center of the chamfered surface of the chamfered corner.

3. The energy storage device according to claim 1, wherein the chamfered surface of the chamfered edge is a flat surface or a curved convex surface which extends along the periphery of the electrode terminal, and
wherein the chamfered surface of the chamfered corner is a flat surface or a curved concave surface which faces and extends along the flat surface or the curved convex surface forming the chamfered surface of the chamfered edge.

4. The energy storage device according to claim 3, wherein the electrode terminal has a shape having a long side and a short side which intersects the long side,
wherein the protrusion on the flat surface is shifted outwardly in a longitudinal direction of the electrode terminal from a center of the flat surface in the peripheral direction of the electrode terminal, and
wherein the protrusion on the curved convex surface or the curved concave surface is shifted inwardly in the longitudinal direction of the electrode terminal from a center of the curved convex surface or a center of the curved concave surface in the peripheral direction of the electrode terminal.

5. The energy storage device according to claim 1, wherein the electrode terminal includes four chamfered edges,
wherein the peripheral wall includes four chamfered corners,
wherein a chamfered surface of at least one of the four chamfered edges is a flat surface which extends along the periphery of the electrode terminal,
wherein a chamfered surface of at least one of the four chamfered edges is a curved convex surface which extends along the periphery of the electrode terminal, wherein a chamfered surface of at least one of the tour chamfered corners is a flat surface which faces and extends along the flat surface of the chamfered edge, and wherein a chamfered surface of at least one of the four chamfered corners is a curved concave surface which faces and extends along the curved convex surface of the chamfered edge.

6. The energy storage device according to claim 5, wherein, with respect to the wall, planar shapes of an outer periphery of the electrode terminal and an inner periphery of the peripheral wall are rectangle, wherein two chamfered edges which include the flat surfaces are disposed at a diagonal position, wherein two chamfered corners which include the flat surfaces are disposed at a diagonal position, wherein two chamfered edges which include the curved convex surfaces are disposed at a diagonal position, wherein two chamfered corners which include the curved concave surfaces disposed at a diagonal position, wherein, in a peripheral direction of the electrode terminal, the protrusion on the flat surface is shifted from a center of the flat surface toward a short side of the electrode terminal or a short side of the peripheral wall, wherein, in the peripheral direction of the electrode terminal, the protrusion on the curved convex surface is shifted from a center of the curved convex surface toward a long side of the electrode terminal or a long side of the peripheral wall, and wherein, in the peripheral direction of the electrode terminal, the protrusion on the curved concave surface is shifted from a center of the curved concave surface toward the long side of the electrode terminal or the long side of the peripheral wall.

7. The energy storage device according to claim 1, wherein the protrusion is a pillar-shaped protrusion which includes a curved convex surface including a curve in a peripheral direction of the electrode terminal, and extends in a direction which is perpendicular to the wall.

* * * * *